United States Patent
Jia et al.

(10) Patent No.: US 11,614,963 B2
(45) Date of Patent: Mar. 28, 2023

(54) MACHINE LEARNING BASED RUNTIME OPTIMIZATION

(71) Applicant: International Business Machines Corporation, Armonk, NY (US)

(72) Inventors: Hong Wei Jia, Beijing (CN); Guang Ming Zhang, Beijing (CN); Mo Chi Liu, Beijing (CN); Yun BJ Wang, Beijing (CN); Wu Yan, Beijing (CN); Xiaoyang Yang, San Francisco, CA (US); He Sheng Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 17/032,303

(22) Filed: Sep. 25, 2020

(65) Prior Publication Data
US 2022/0100558 A1   Mar. 31, 2022

(51) Int. Cl.
*G06F 9/48* (2006.01)
*G06F 9/445* (2018.01)
*G06N 20/00* (2019.01)

(52) U.S. Cl.
CPC ........ *G06F 9/4881* (2013.01); *G06F 9/44505* (2013.01); *G06N 20/00* (2019.01)

(58) Field of Classification Search
CPC .................................................... G06F 9/4881
See application file for complete search history.

(56) References Cited

U.S. PATENT DOCUMENTS

| | | | |
|---|---|---|---|
| 8,434,088 B2 | 4/2013 | Banerjee et al. | |
| 11,301,351 B2* | 4/2022 | Bigaj | G06F 11/3452 |
| 2006/0161884 A1 | 7/2006 | Lubrecht et al. | |
| 2019/0146424 A1 | 5/2019 | Buda et al. | |

OTHER PUBLICATIONS

Chun et al., "Dolphin: Runtime Optimization for Distributed Machine Learning," ML Systems Workshop—33 rd International Conference on Machine Learning, Jun. 2016, pp. 1-6.
Peng et al., "Optimus: an efficient dynamic resource scheduler for deep learning clusters," In Proceedings of the Thirteenth EuroSys Conference, Apr. 2018, pp. 1-14.
Ogilvie et al., "Announcing Databricks Runtime for Machine Learning," The Databricks Blog, https://databricks.com/blog/2018/06/05/announcing-databricks-runtime-for-machine-learning.html, Jun. 2018, pp. 1-4.

(Continued)

*Primary Examiner* — Charlie Sun
(74) *Attorney, Agent, or Firm* — Matt Zehrer; Otterstedt & Kammer PLLC

(57) ABSTRACT

A method of operating a shared computing environment includes receiving a client request for an optimized runtime configuration of the shared computing environment for executing a task, receiving runtime data of the task collected from a prior runtime, inferring a runtime configuration from the runtime data, determining a predicted timeseries workload for the shared computing environment, updating the runtime configuration to including the timeseries workload prediction, wherein the updating outputs the optimized runtime configuration, and configuring the shared computing environment according to the optimized runtime configuration in executing the task.

20 Claims, 10 Drawing Sheets

(56) References Cited

OTHER PUBLICATIONS

Disclosed Anonymously, "Scheduling System and Method for the Jobs with Inaccurate Resource Requirements," IP.com IPCOM000252325D, Jan. 2018, pp. 1-4.

Disclosed Anonymously, "Application Integration: Propagation application pattern: Runtime patterns," https://www.ibm.com/developerworks/patterns/application/at6-runtime.html, downloaded Jul. 2020, pp. 1-3.

Disclosed Anonymously, "Patterns—IBM App Connect Enterprise, Version 11.0.0.9," https://www.ibm.com/developerworks/patterns/application/at6-runtime.html, downloaded Jul. 2020 (updated Sep. 2020), pp. 1-2.

* cited by examiner

MACHINE LEARNING BASED RUNTIME OPTIMIZATION

BACKGROUND

The present disclosure relates generally to a computer processes, and more particularly to optimizing runtime processes of a system providing shared resources.

Data scientists use Jupyter Notebook (an open-source web application that allows users to create and share documents that contain live code, equations, visualizations and narrative text) or SPSS Modeler (a data mining and text analytics software application) on Cloud Pak for Data (fully-integrated data and artificial intelligence (AI) platform for collection, organizing and analyzing data to infuse AI throughout organizations) to build machine learning (ML) models. These platforms are typically shared platforms (e.g., among business analysts, data engineers, etc.).

Runtime is important to the performance of these platforms. Runtime performance can be affected by resource capacity and availability (e.g., processing, memory, etc.), and a task scheduler.

Since these are shared platforms, the users cannot configure the runtimes to use maximum resources. Moreover, some specific tasks, such as model training tasks, are both resource intensive and time consuming.

Currently, there's no runtime optimization mechanism available.

SUMMARY

According to some embodiments of the present invention, a method of operating a shared computing environment includes receiving a client request for an optimized runtime configuration of the shared computing environment for executing a task, receiving runtime data of the task collected from a prior runtime, inferring a runtime configuration from the runtime data, determining a predicted timeseries workload for the shared computing environment, updating the runtime configuration to including the timeseries workload prediction, wherein the updating outputs the optimized runtime configuration, and configuring the shared computing environment according to the optimized runtime configuration in executing the task.

According to some embodiments, a method of allocating resources of a shared computing environment to a plurality of tasks includes receiving a plurality of client requests for an optimized runtime configuration of the shared computing environment for executing respective tasks, receiving runtime data of the tasks collected from a prior runtime, inferring a runtime configuration of each of the tasks from the runtime data, determining a predicted timeseries workload for the shared computing environment, updating the runtime configuration of each of the tasks to including the timeseries workload prediction, wherein the updating outputs the optimized runtime configuration of each of the tasks, scheduling an execution of each of the tasks over a time window according to the runtime configurations of each of the tasks, and configuring the shared computing environment over the time window according to the optimized runtime configurations in executing the tasks.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

intelligently optimizing runtimes adapted to specific patterns of client usage.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Figure 1:
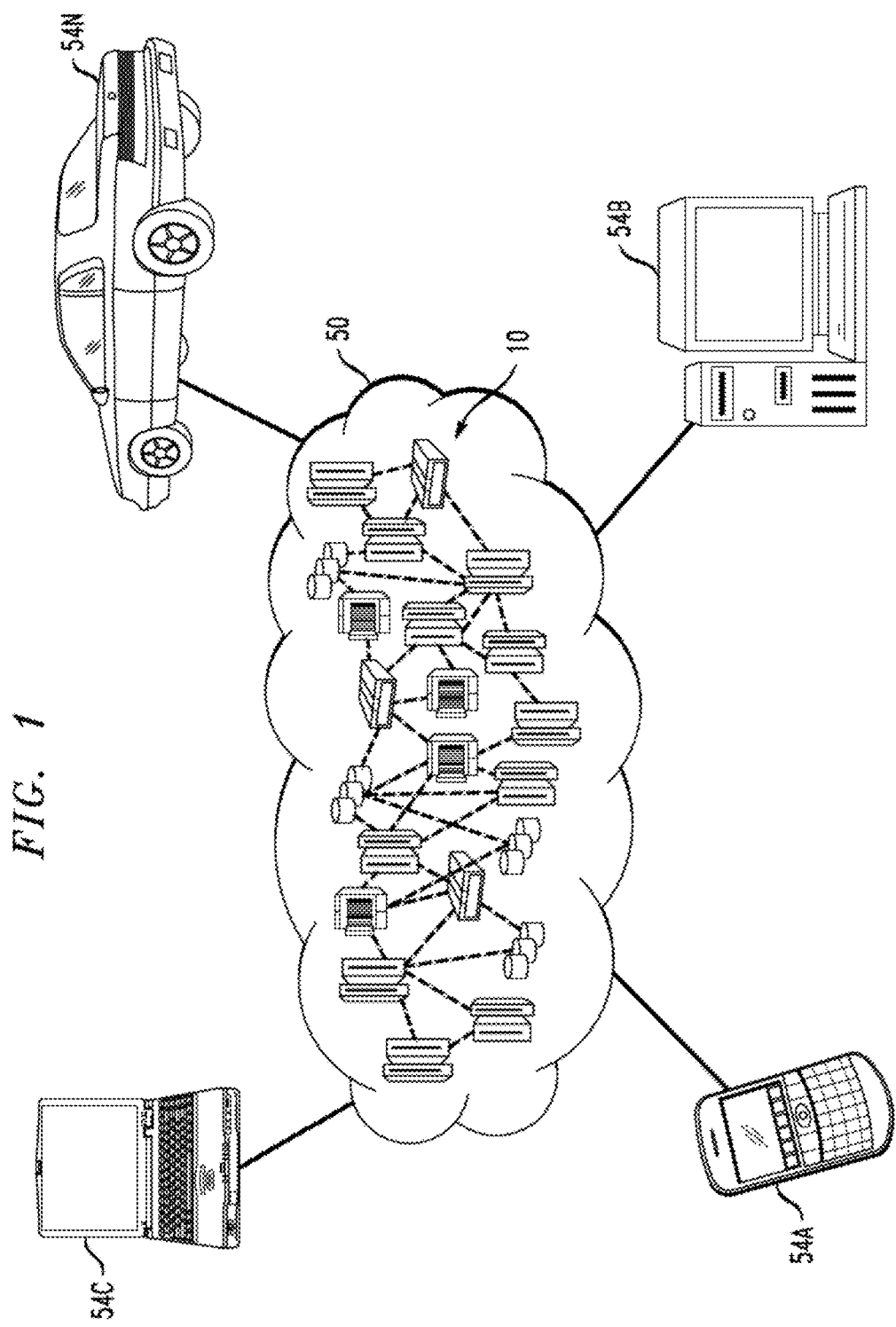
FIG. 1 depicts a cloud computing environment according to an embodiment of the present invention.

Some computer model training tasks are both resource intensive and time consuming. System clients (e.g., data scientists) typically do not have access to resource management controls or the expertise to effectively configure these controls. According to some embodiments, an intelligent scheduler automatically adapts runtimes for a set of tasks to specific patterns of client usage. According to at least one embodiment, the intelligent scheduler determines an improved resource and time allocation, which can be used for scheduling the model training tasks in specific time windows.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
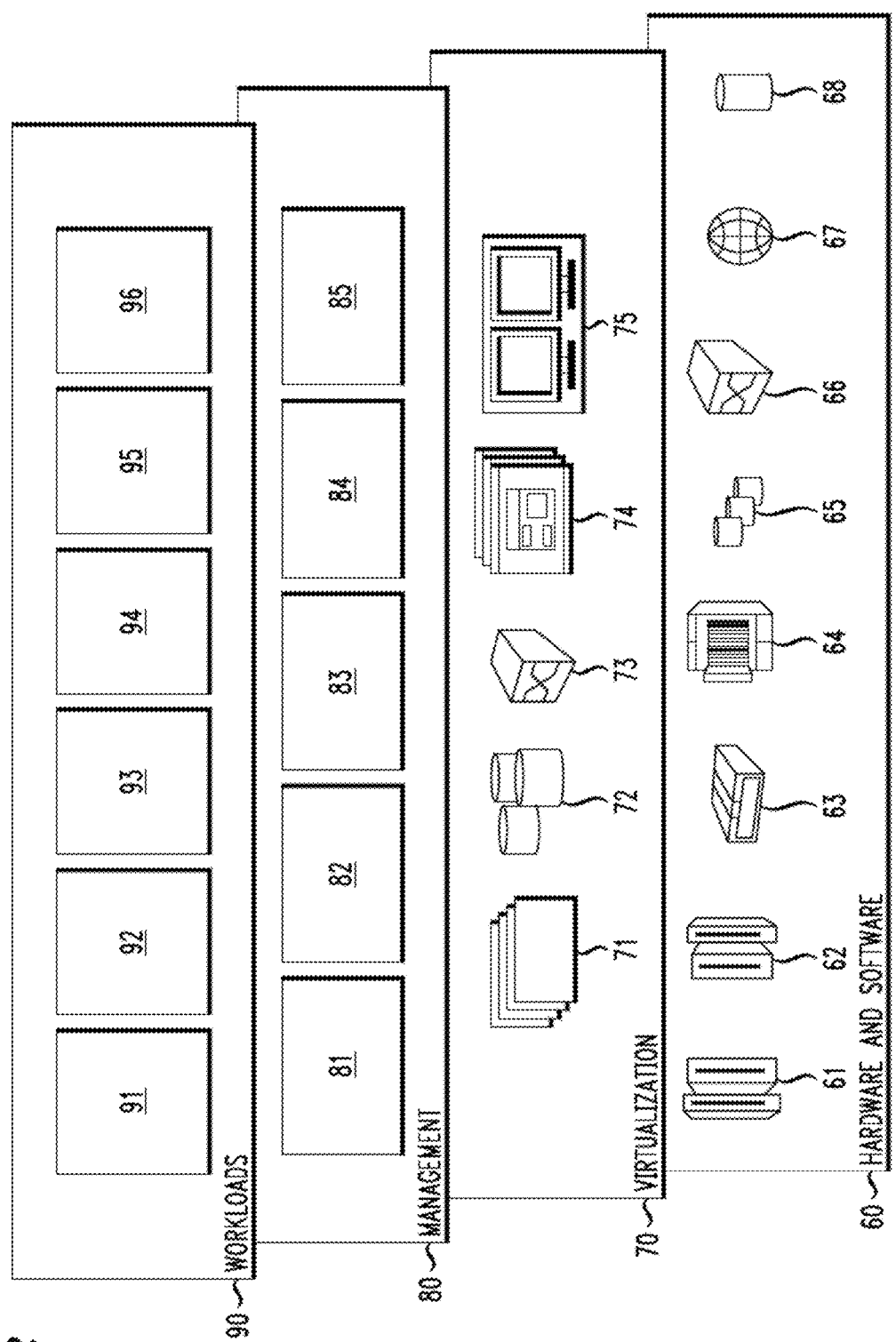
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent optimization of runtimes adapted to a specific pattern of client usage 96.

According to some embodiments of the present invention, client machine learning (ML) tasks to be run on a shared system are scheduled according to discovered patterns of system usage (of the client).

According to one or more embodiments, a client of a system executes a plurality of tasks (e.g., Runtimes A, B, . . . , Z) and runtime data is collected 301. According to some embodiments, patterns in the collected runtime data are discovered 302. According to some embodiments, the pattern discovery 302 can include use case profiling and pattern analysis to obtain information about the client's processes including context, features, labels, data classes and the available algorithms (i.e., to execute at runtime). Discovered patterns are used to build a model (e.g., a runtime knowledge graph) representing the client's runtime process 303.

According to some embodiments, a runtime schedule for a plurality of ML tasks is output, which is adapted to models of client runtime processes. It should be understood that the client runtime processes can be determined for the same client or for a plurality of clients in a shared system environment.

Figure 4:
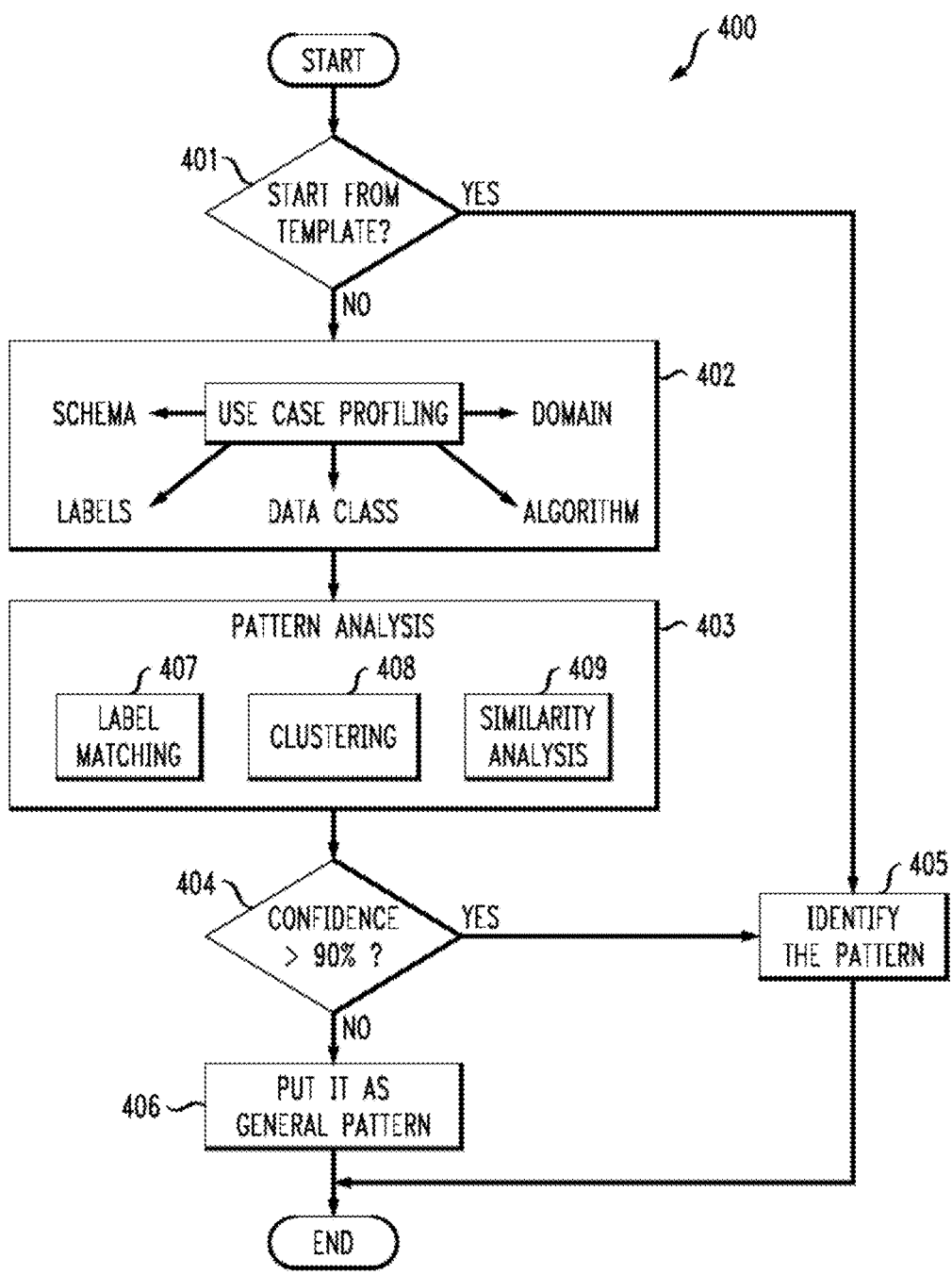
FIG. 4 is a flow diagram of a method of pattern discovery according to an embodiment of the present invention.

Referring to method 300, a client request for a runtime optimization is received 304, and one or more patterns are discovered 305 in data collected from the prior runtimes at block 301 (see also FIG. 4). At block 306, an improved runtime configuration is inferred (see also FIG. 5). A time-series workload prediction is determined for the improved runtime configuration at block 307, which is used in determining a runtime optimization at block 308 (see also FIG. 7 and FIG. 8), which can be output as a configuration file 309 (the ML runtime).

It should be understood that the determination of the runtime optimization 308 further comprises executing the client tasks using the runtime optimization determined at block 308. Accordingly, embodiments of the present invention include advantageously configuring a computer system to automatically implement the runtime optimization for the client task(s).

According to one or more embodiments, and referring to block 305, a pattern discovery method (see 400, FIG. 4) determines whether a pattern template of the client's runtime data is available 401. According to some embodiments, the pattern template is provided by (received from) the client. According to at least one embodiment, the pattern template is selected from a catalog of pattern templates (by or for the client). The catalog can be stored in a pattern repository.

A pattern (and pattern template) is a reusable solution that encapsulates a tested approach to solving a architecture, design, or deployment task in a particular context. A pattern captures a tested solution to a commonly recurring problem (e.g., appearing in the client's previous runtime executions of a ML task), addressing the objectives that the client wants to achieve. A specification of a pattern (or pattern template) describes the problem being addressed, why the problem is important (e.g., a value statement), and any constraints for the solution. Patterns typically emerge from common usage and the application of a particular product or technology.

Figure 3:
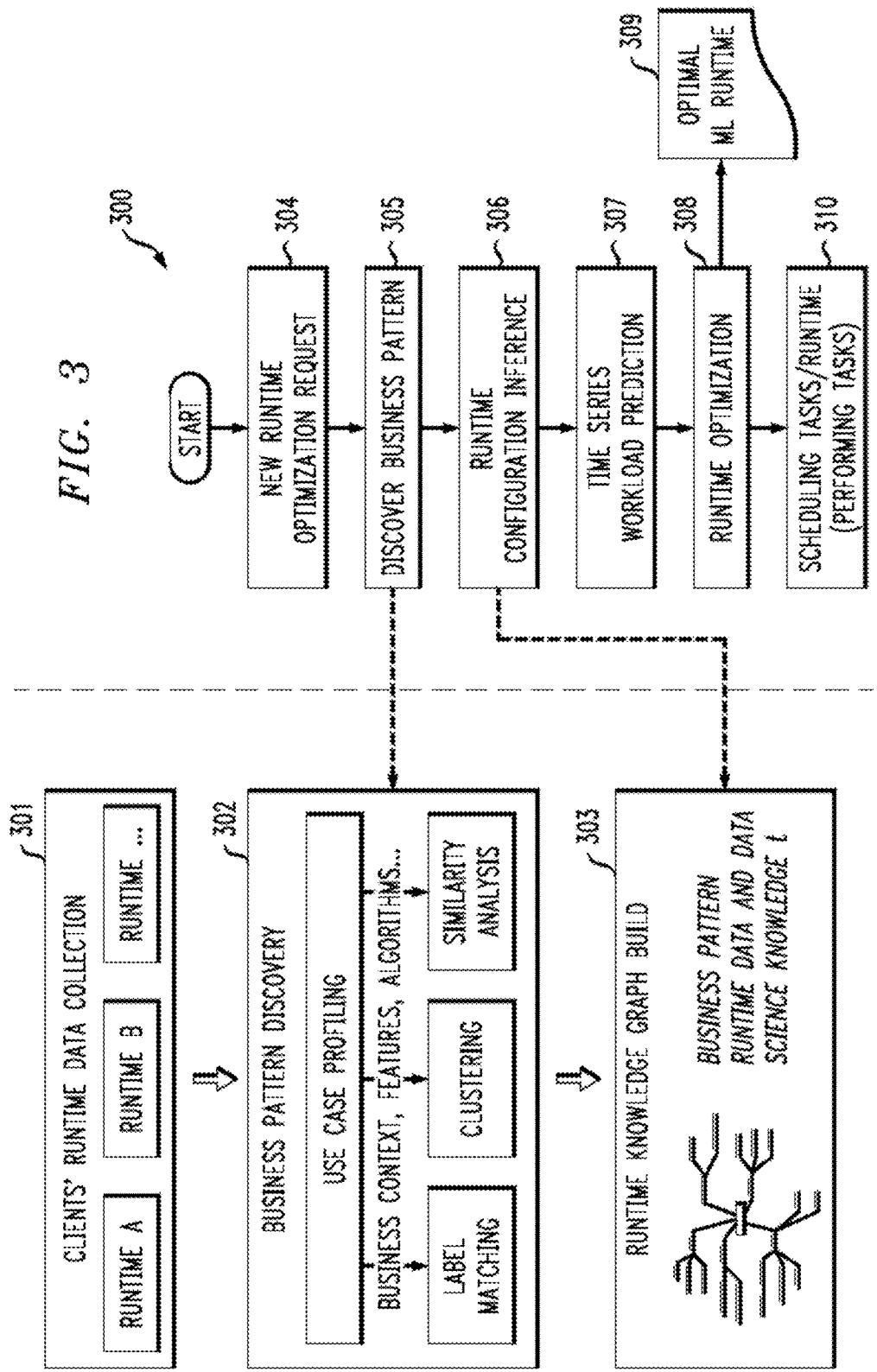
FIG. 3 is a flow diagram a method for runtime optimization according to an embodiment of the present invention.

According to some embodiments, each pattern has values that are known as pattern parameters. Pattern parameters are parameters that customize and configure a pattern. According to some embodiments, the pattern parameters can be used to create pattern resources for use in a given client environment (see 305, FIG. 3 and 400, FIG. 4). Certain pattern parameters are configurable depending on the specific pattern and the pattern's options.

Upon determining that a pattern template is available at 401, a pattern is identified at block 405. Stated another way, at least one of the pattern templates of the catalog/repository is adopted as the pattern for the client's collected runtime data.

In a case where no template is available at 401, the method uses case profiling 402 to determine schema, features/labels, data classes, available algorithms, domains, etc. from the client's collected runtime data in creating a discovered pattern. The profiling 402 can include, for example, data similarity analysis. At block 403, a pattern analysis is performed on the data extracted by the use case profiling. The pattern analysis 403 attempts to find patterns in the collected runtime data for a particular client. The pattern analysis 403 can include label matching, clustering, similarity analysis, and the like.

It should be understood that, at block 403, a pattern repository is available. Each pattern in the pattern repository has aspects including a Domain (e.g., banking, insurance, etc.), a User Scenario (e.g., credit default prediction, customer segmentation, customer churn, etc.), Algorithms used (e.g., LGBM, XGB, etc.), and Features/Labels.

A pattern is selected from the pattern repository based on a discovered pattern. The discovered pattern is created based on client specifications and/or runtime data. The pattern selection 403 includes one or more of label matching (e.g., a features comparison) 407, clustering 408, and similarity analysis 409. The confidence for a selected pattern is calculated at block 404.

Figure 9:
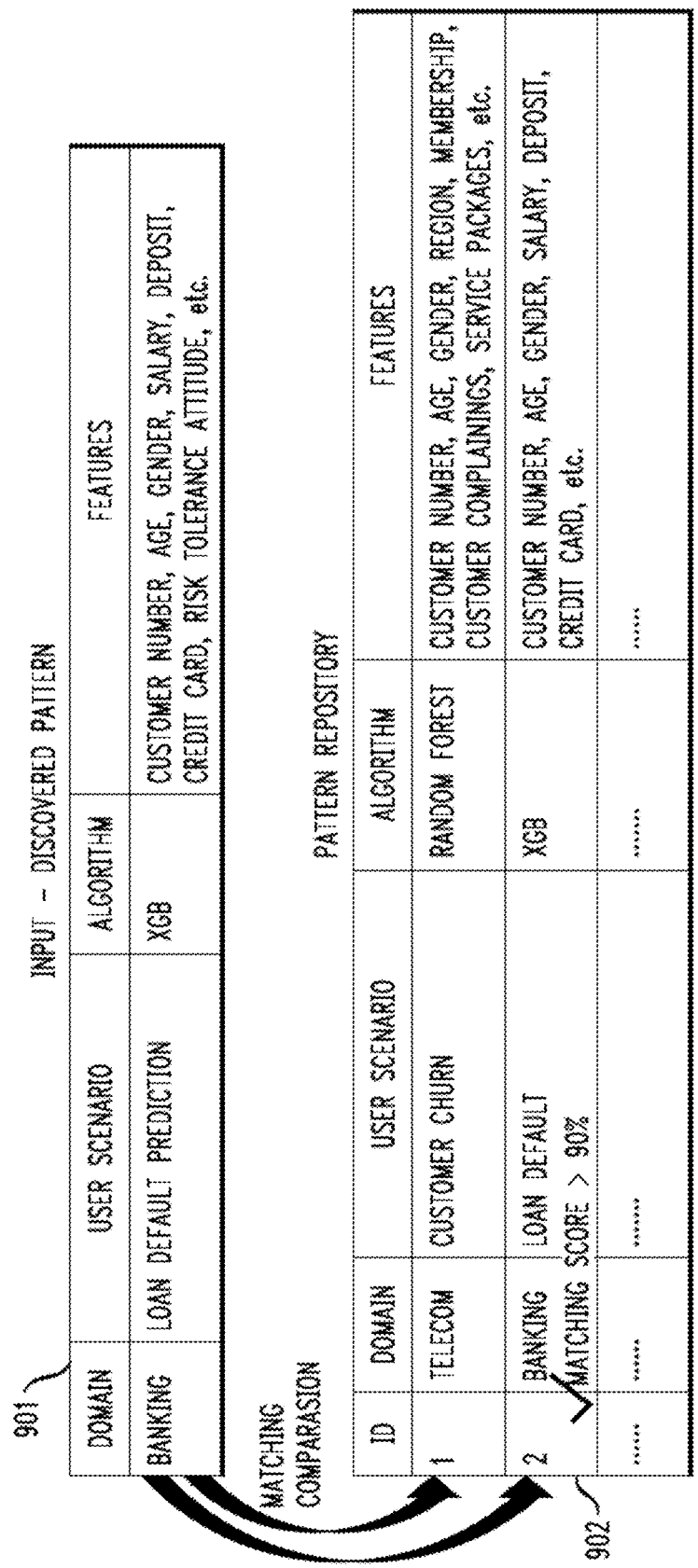
FIG. 9 depicts a selection of a pattern given a discovered pattern according to an embodiment of the present invention.

FIG. 9 illustrates an example discovered pattern 901 with a number of aspects compared to a plurality of patterns. As shown in FIG. 9, a pattern (ID 2) 902 is a best match to the discovered pattern 901, having a match with a highest confidence (e.g., greater than 90%). For example, while "risk tolerance" in the discovered pattern and "deposit" in the pattern do not match, the remaining aspects (e.g., the domain, the algorithm, features including "customer age" and "salary") do match. Further, pattern 902 matches the discovered pattern better than any other pattern in the pattern repository.

Referring to the pattern analysis 403, consider the example of the following business patterns in a pattern repository:

1 Customer 360 Degree View
2 Customer Attrition Prediction
3 Customer Life Event Prediction
4 Customer Segmentation
5 Intelligent Maintenance Prediction
6 Loan Default Analysis
7 Credit Card Fraud
. . .

Each pattern has its own features or labels, data classes, etc. For example, pattern 7, "Credit Card Fraud," includes the labels "finance," "fraud," "credit card," and "bank," and data classes "State," "Home Address," "Employment Type," "Age," "Account Number," "City," "Country Code," "Transaction," "Transaction Amount," "Work Address," etc.

In an example case, a client uses a service, such as Cloud Pak for Data, to develop a new customer churn model for an insurance product, but the client doesn't know what resources (e.g., runtime) will be needed within their cluster (a cluster is a cloud service that is customized to a client's use case), where the cluster has limited resources (e.g., 4 work stations, each work station having 64 gigabytes (Gb) memory, 32-core CPU). In the example case, the client specifies 3 gigabytes (3 Gb) of data volume and an XGM algorithm (e.g., a decision-tree-based ensemble machine learning algorithm using a gradient boosting framework) for training the customer churn model.

Given the example, the client's proposed customer churn model is profiled (see block 403). Since the customer churn model is insurance-related, the labels "finance," "insurance," "customer churn," "data:5G," "4worker," "worker: 64G," and "worker:32core" are extracted from the client's specifications and added to a newly created pattern (i.e., a discovered pattern) associated with the customer churn model. The discovered pattern is also updated to indicate "XGB" as its Algorithm, and "Finance," "Insurance" as its Domain according to the client's specification. Additionally, data associated with the customer churn model (e.g., example input data) is analyzed to extract the following Data Classes: "City," "Express Card," "Address Line," "Account Number," "Employment Status," "Hobby/Leisure Activity," "Transaction," "Transaction Amount." These data classes are added to the discovered pattern for the customer churn model.

Once the discovered pattern is known, the method includes performing a pattern analysis at block 403. The pattern analysis includes searching for the labels specified in the discovered pattern in the labels defined in the patterns in the pattern repository. According to some embodiments, the pattern analysis 403 returns one or more patterns from the pattern repository. For example, through label matching 407, the method identifies the patterns Credit Card Fraud and Customer Attrition Prediction from the pattern repository. A comparison of use cases may result in the selection of the Credit Card Fraud pattern as a term discovery result.

While the example use case describes label matching 407, one of ordinary skill in the art would recognize that clustering analytics 408, similarity analytics 409, etc., can be used to identify one or more patterns in the pattern repository given a discovered pattern.

According to some embodiments, the clustering 408 is performed using a knowledge graph is built using the patterns of the pattern repository. The knowledge graph is a collection of facts about the patterns of the pattern repository (a structured data source), and more particularly, the pattern parameters of the patterns (e.g., the data associated with the aspects). It should be understood that knowledge graph embeddings can be used for entity clustering, entity disambiguation, and other downstream tasks. For example, with the selected pattern as input, the knowledge graph is mined at block 403 to obtain a resource configuration for the client's application at runtime.

According to some embodiments, a confidence is calculated for the selected pattern (e.g., the Credit Card Fraud pattern) at block 404, which is related to how well the pattern reflects the discovered pattern. In cases where the confidence is less than a threshold value (e.g., less than 90%), the selected pattern is indicated to be a general pattern for the discovered pattern at block 406. Otherwise, if the confidence greater than the threshold, the selected pattern is considered to be identified as accurately representing the discovered pattern at block 405. It should be understood that the selected pattern with a confidence greater than a threshold accurately reflects the client's discovered pattern and the collected runtime data, and therefore the underlying client task being performed by the system.

According to one or more embodiments and referring to block 306, an improved runtime configuration is inferred from interactions with a knowledge graph (303—see also FIG. 5 and FIG. 6) to obtain an improved resource configuration for the ML models.

Figure 5:
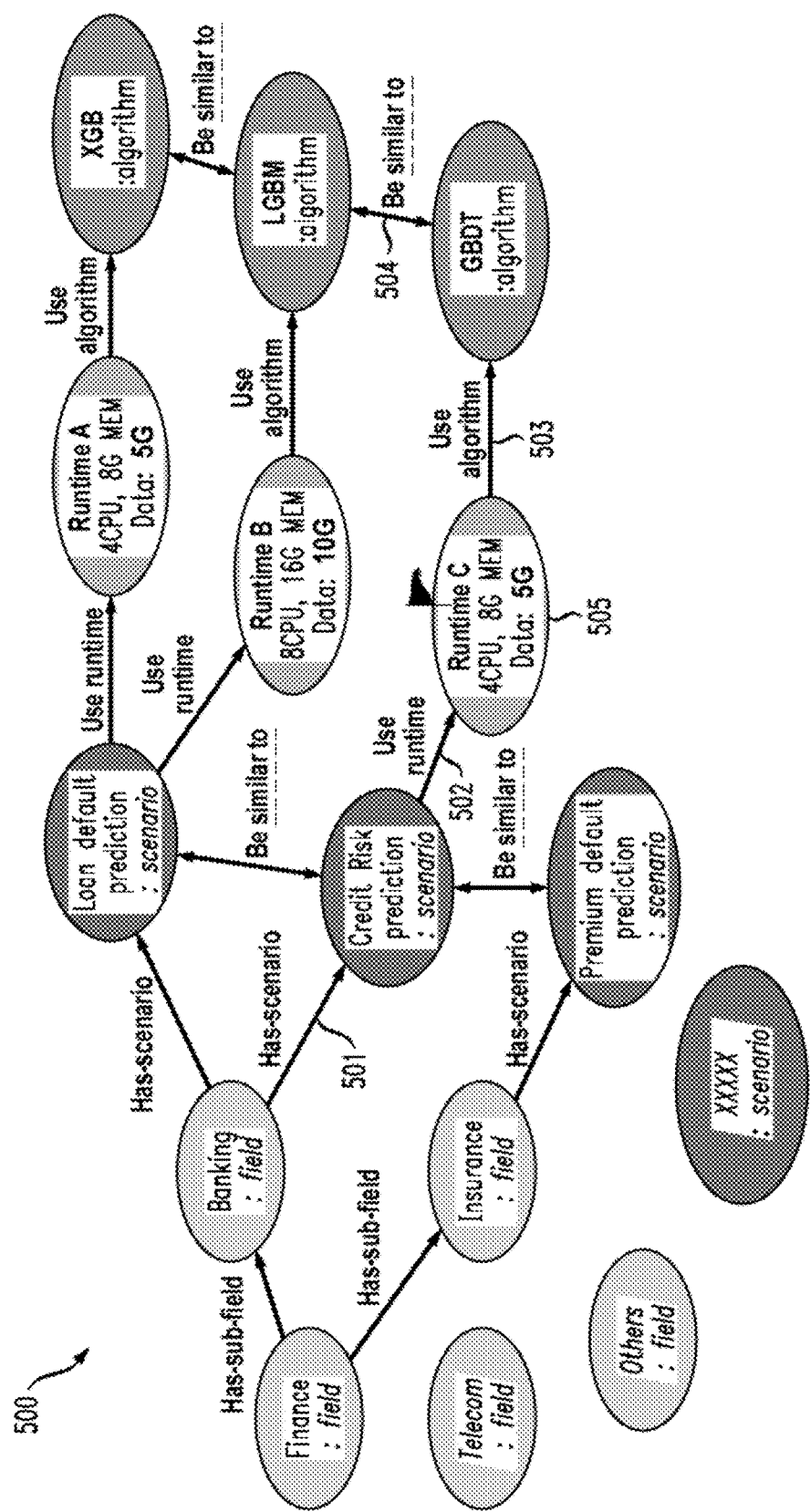
FIG. 5 depicts the inference of a runtime configuration according to an embodiment of the present invention.

According to some embodiments and referring to FIG. 5, a knowledge graph 500 is built based on best practice libraries, combining knowledge graphs for best practice reasoning and recommendation, and best practice libraries open, shared, and continuously optimized. The knowledge graph 500 associates features of the pattern, including fields, scenarios, runtime models, and algorithms (i.e., for execution during a runtime), such that the knowledge graph 500 can be used by the system to automatically schedule a runtime task based on a client's request.

FIG. 5 illustrates the processing of an example submission (e.g., by a client/data scientist) of a training task with the following properties:

Field: Banking,
Business Scenario: Credit Risk prediction,
Algorithm: LGBM,
Data (volume): 5Gb The system uses the properties of the client's submission to infer, e.g., from the knowledge graph, an implementation with the steps represented by vertices 501 (has-scenario), 502 (use runtime), 503 (use algorithm), and 504 (be similar to). The inference result is a recommendation contained in node 505 of an optimized runtime configuration (4 CPU, 8Gb Memory (Mem)). More particularly, vertex 504 represents that GBDT and LGBM (which was specified by the user) are similar or interchangeable.

Figure 6:
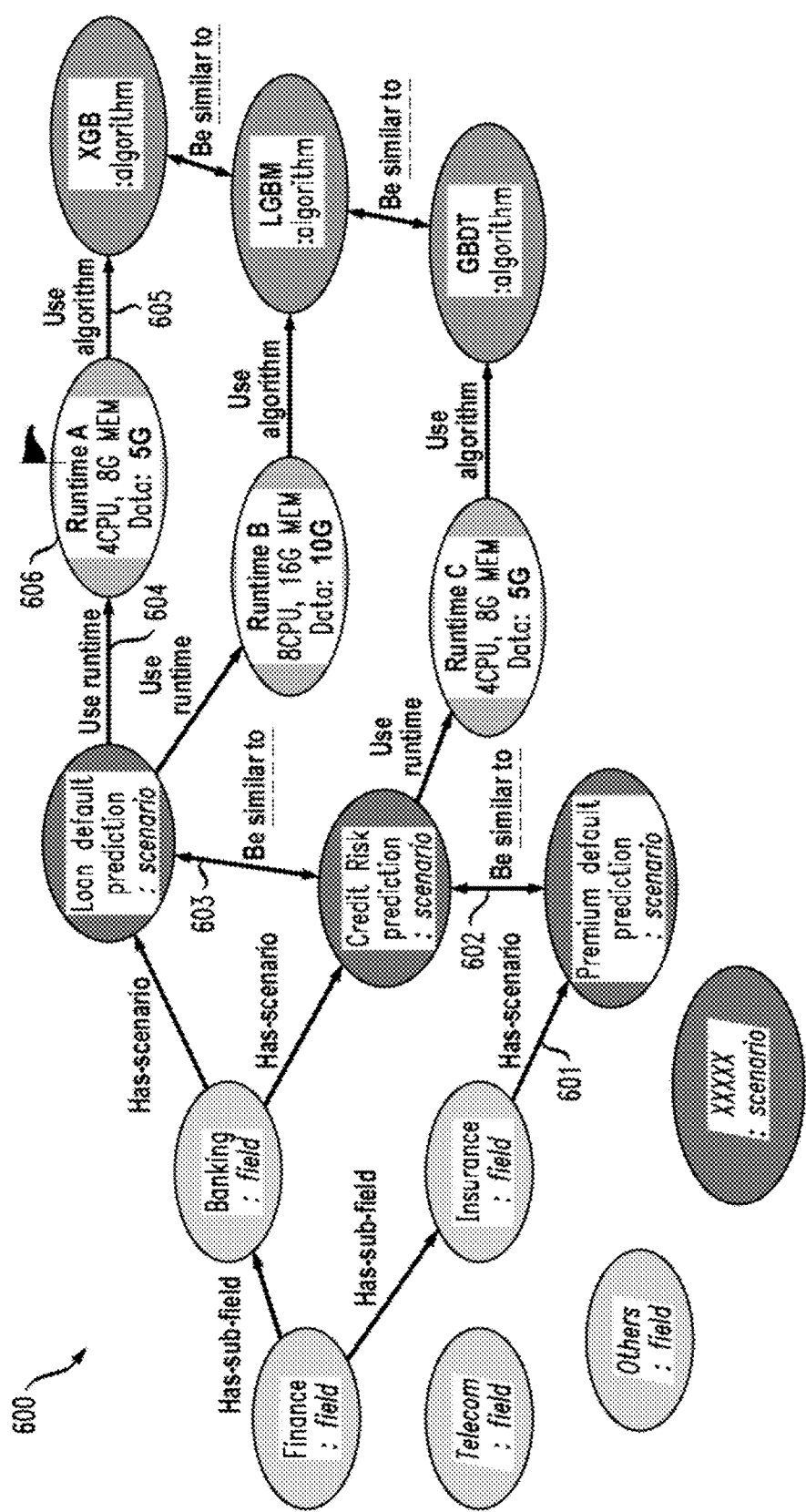
FIG. 6 depicts the inference of a runtime configuration according to an embodiment of the present invention.

Referring to the knowledge graph 600 of FIG. 6, for an example submission (e.g., by a client/data scientist) of a training task with the following properties:

Field: Insurance,
Business Scenario: Premium default prediction,
Algorithm: XGB,
Data (volume): 5Gb The system uses the properties of the client's submission to infer, from the knowledge graph 600, an implementation 306 with the steps represented by vertices 601 (has-scenario), 602 (be similar to), 603 (be similar to), 604 (use runtime), and 605 (use algorithm). The inference result is a recommendation contained in node 606 of an optimized runtime configuration (4 CPU, 8G Mem).

As shown in FIG. 6, the scenario "Premium default prediction" is not directly associated with a runtime configuration. In this example case, the available scenarios are known to be similar, and the system infers the runtime configuration (i.e., associated with node 605), based on the Algorithm and Data properties specified by the client.

According to some embodiments, the runtime activation and ML tasks are scheduled intelligently based on time series prediction of the system workload(s). According to some embodiments, scheduling 308 uses the resource configuration and a time series prediction and analysis of the system's workloads. Scheduling 308 can include a recommendations output to a client based on predictions of system load at different time windows. According to some embodiments, scheduling 308 includes outputting a command causing the system to perform the client's task, for example, in a certain time window, with certain system resources, etc.

Figure 7:
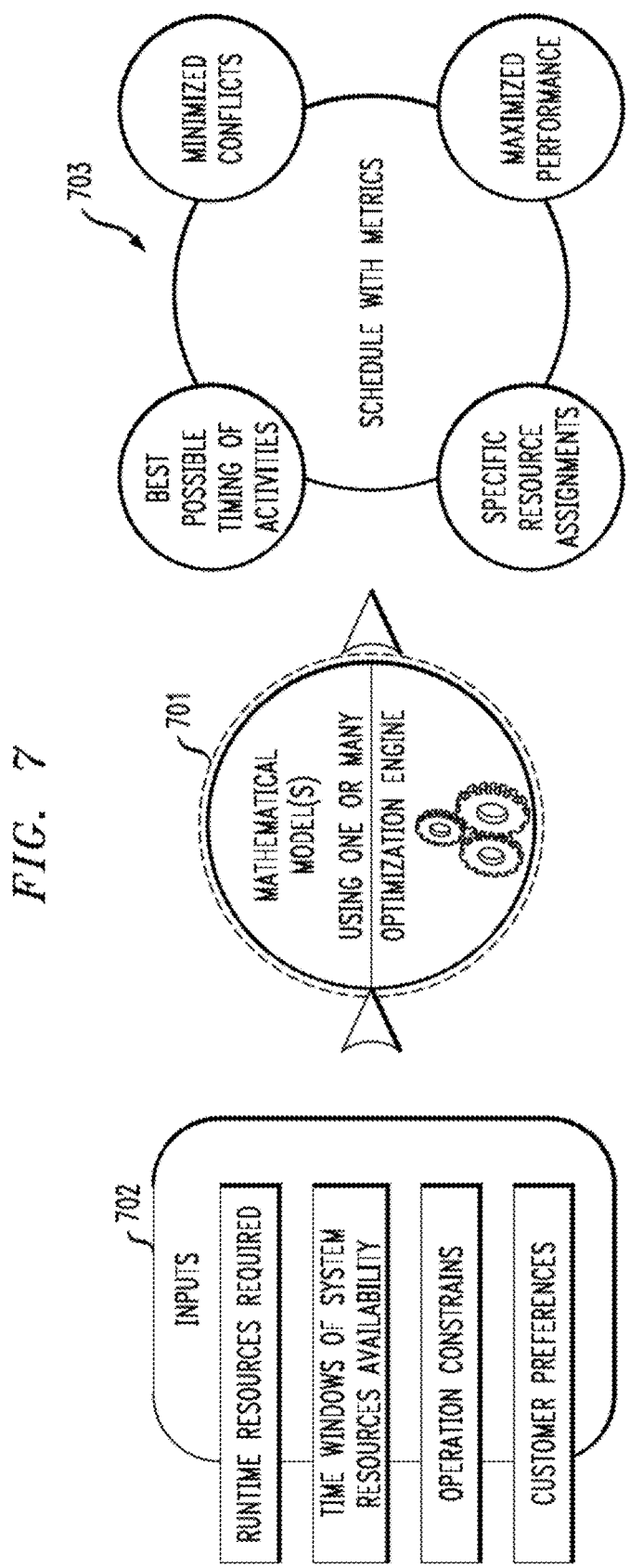
FIG. 7 depicts a runtime optimization according to an embodiment of the present invention.

FIG. 7 shows an implementation of a scheduler 701 configured to receive input data 702 including runtime resources requested by a client (e.g., the optimization request at 304), time windows of system availability, operational constraints, and client preferences. The scheduler 701 uses the input data 702 to output an improved ML runtime schedule 703 (see 310, FIG. 3, and 800, FIG. 8). The scheduler 701 uses a specific pattern as input, and interacts with a knowledge graph to determine a resource configuration for each task (see also 308, FIG. 3) at the runtime 703. The scheduler 701/schedule 703 can, for example, improve timing of the client's task (e.g., according to the client preferences—for example, a certain time for completion), reduce recourse conflicts (e.g., with other tasks being performed by the shared system), allocate specific resources to one or more tasks at a given time and over time, achieving improved (e.g., maximum) performance of the system (e.g., throughput) and/or tasks executed by the system (e.g., given the operational constraints), etc.

Example constraints can ensure that each deployed client application on a server system is allocated a minimum amount of memory resources, processor resources, etc.

According to some embodiment, by utilizing the inputs described herein (e.g., runtime resources required for a task, client preferences, system constraints, etc.), a Monte Carlo Simulation can be used at 701 to solve a stochastic optimization problem and output a schedule 703. It should be understood to one skilled in the art that other techniques in the field of artificial intelligence can be used, for example fuzzy logic, Bayesian networks, etc. According to some embodiments, a further packing algorithm can be used in combination with the Monte Carlo Simulation to generate a sequence of tasks and assign the tasks to the server system(s).

Figure 8:
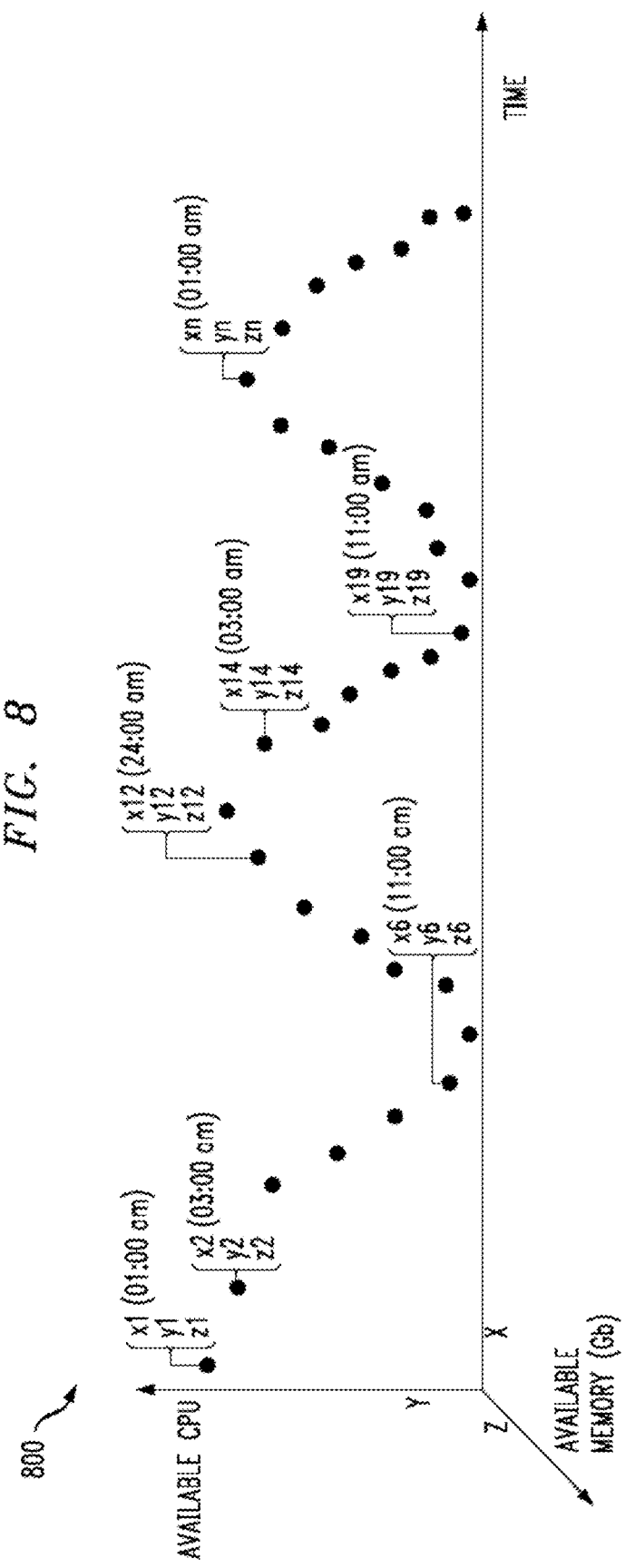
FIG. 8 is a graph illustrating a time series prediction method according to an embodiment of the present invention.

Referring to FIG. 8, according to some embodiments, the system uses a timeseries prediction 307 to make a forecast for an available CPU resources and available memory resources with Long Short-Term Memory (LSTM) (e.g., an artificial Recurrent Neural Network (RNN) architecture used for deep learning) based on a positive correlation between CPU and memory. In the graph 800 of FIG. 8 available CPU (e.g., available processor cycles) are given on a Y axis, available memory (e.g., measured in gigabytes (Gb)) are given on a Z axis, and time is given on an X axis. Thus, the time series prediction can be as follows:

$$Z = \theta Y + R$$

where Z represents available memory, Y represents available processor resources (e.g., CPU cycles), $\theta$ is an correlation coefficient variable, and R represents a residual. As memory and processing resources are (approximately) correlated linearly, it can be assumed that $Z = \theta Y + R$.

For example, the target timeseries function to be forecast with the LSTM model can be written as:

$$F(Z,X) = F(\theta XY + R, X),$$

which states that a function (F) of memory and time is equal to a function of the correlation between time and available processor resources, plus a residual, and time.

Recapitulation:

According to some embodiments, a method of operating a shared computing environment includes receiving a client request for an optimized runtime configuration of the shared computing environment for executing a task 304, receiving runtime data of the task collected from a prior runtime 301, inferring a runtime configuration from the runtime data 306, determining a predicted timeseries workload for the shared computing environment 307, updating the runtime configuration to including the timeseries workload prediction 308, wherein the updating outputs the optimized runtime configuration, and configuring the shared computing environment according to the optimized runtime configuration in executing the task 308.

According to some embodiments, a method of allocating resources of a shared computing environment to a plurality of tasks includes receiving a plurality of client requests for an optimized runtime configuration of the shared computing environment for executing respective tasks 702, receiving runtime data of the tasks collected from a prior runtime 301, inferring a runtime configuration of each of the tasks from the runtime data 305/306, determining a predicted timeseries workload for the shared computing environment 307, updating the runtime configuration of each of the tasks to including the timeseries workload prediction 308, wherein the updating outputs the optimized runtime configuration of each of the tasks, scheduling an execution of each of the tasks over a time window according to the runtime configurations of each of the tasks 310/703, and configuring the shared computing environment over the time window according to the optimized runtime configurations in executing the tasks 310.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 10:
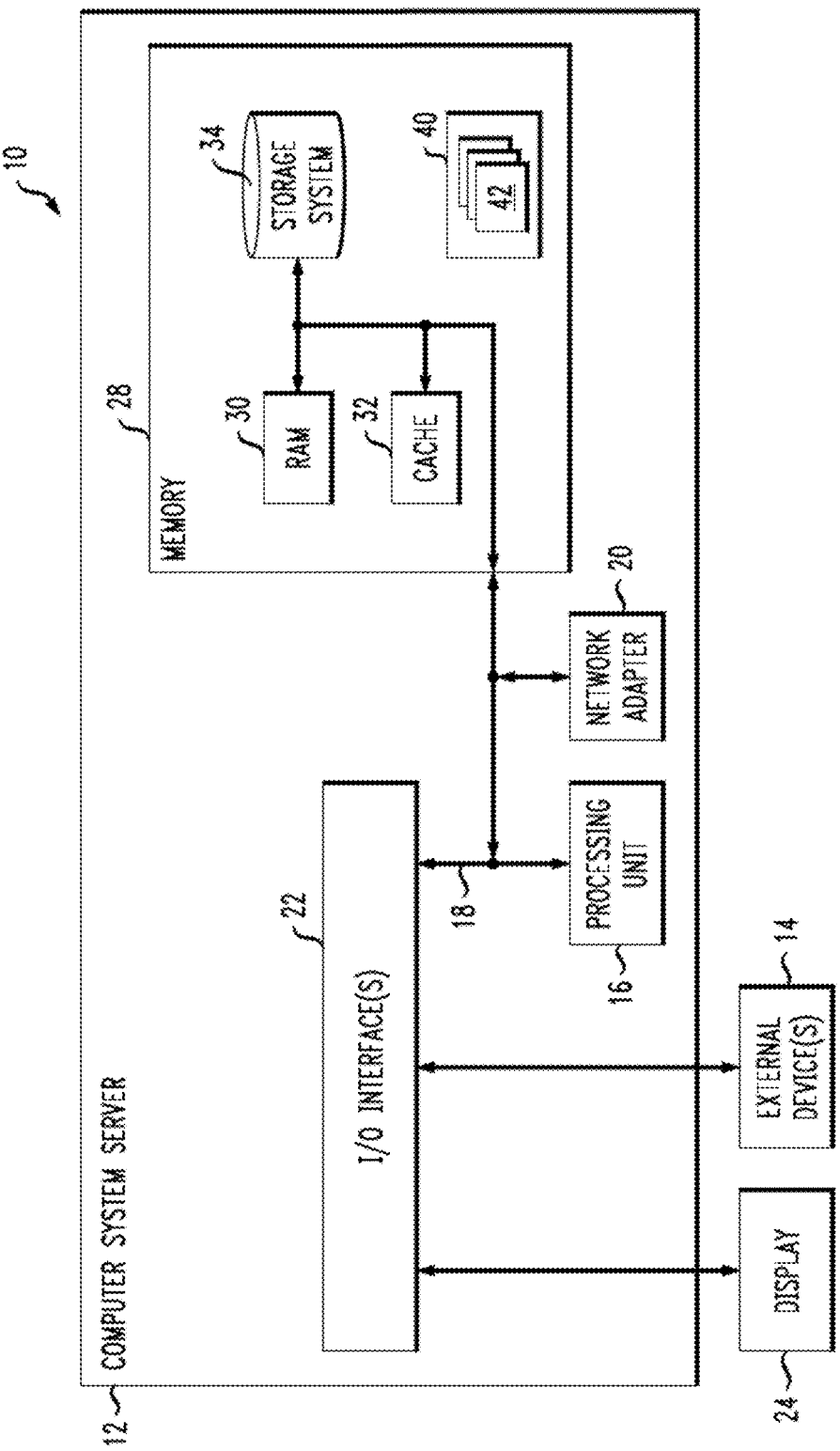
FIG. 10 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating a shared computing environment, the method comprising:
   receiving a client request for an optimized runtime configuration of the shared computing environment for executing a task;
   receiving runtime data of the task collected from a prior runtime;
   inferring a runtime configuration from the runtime data;
   determining a predicted timeseries workload for the shared computing environment;
   updating the runtime configuration to include the timeseries workload prediction, wherein the updating outputs the optimized runtime configuration; and
   configuring the shared computing environment according to the optimized runtime configuration in executing the task.

2. The method of claim 1, further comprising outputting the optimized runtime configuration to a configuration file.

3. The method of claim 1, wherein inferring the runtime configuration further comprises identifying a pattern template for the task based on the runtime data.

4. The method of claim 3, wherein identifying the pattern template further comprises:
   determining a use case profile for the task to discover a pattern of the task; and
   performing a pattern analysis using the pattern discovered for the task to identify the pattern template.

5. The method of claim 4, wherein the pattern analysis comprises at least one of a label matching, a clustering analysis, and a similarity analysis.

6. The method of claim 4, wherein identifying the pattern template further comprises:
- determining a confidence for the pattern template determined by the pattern analysis; and
- identifying the pattern template determined by the pattern analysis as an identified pattern upon determining that the confidence is greater than a threshold.

7. The method of claim 4, wherein identifying the pattern template further comprises:
- determining a confidence for the pattern template determined by the pattern analysis; and
- identifying the pattern template determined by the pattern analysis as a general pattern upon determining that the confidence is less than a threshold.

8. The method of claim 1, wherein the optimized runtime configuration deploys limited processor and memory resources of the shared computing environment to perform the task based on the timeseries workload prediction, and wherein the task is a model training.

9. A non-transitory computer readable storage medium comprising computer executable instructions which when executed by a computer cause the computer to perform a method of operating a shared computing environment, the method comprising:
- receiving a client request for an optimized runtime configuration of the shared computing environment for executing a task;
- receiving runtime data of the task collected from a prior runtime;
- inferring a runtime configuration from the runtime data;
- determining a predicted timeseries workload for the shared computing environment;
- updating the runtime configuration to include the timeseries workload prediction, wherein the updating outputs the optimized runtime configuration; and
- configuring the shared computing environment according to the optimized runtime configuration in executing the task.

10. The non-transitory computer readable storage medium of claim 9, further comprising outputting the optimized runtime configuration to a configuration file.

11. The non-transitory computer readable storage medium of claim 9, wherein inferring the runtime configuration further comprises identifying a pattern template for the task based on the runtime data.

12. The non-transitory computer readable storage medium of claim 11, wherein identifying the pattern template further comprises:
- determining a use case profile for the task to discover a pattern of the task; and
- performing a pattern analysis using the pattern discovered for the task to identify the pattern template.

13. The non-transitory computer readable storage medium of claim 12, wherein the pattern analysis comprises at least one of a label matching, a clustering analysis, and a similarity analysis.

14. The non-transitory computer readable storage medium of claim 12, wherein identifying the pattern template further comprises:
- determining a confidence for the pattern template determined by the pattern analysis; and
- identifying the pattern template determined by the pattern analysis as an identified pattern upon determining that the confidence is greater than a threshold.

15. The non-transitory computer readable storage medium of claim 12, wherein identifying the pattern template further comprises:
- determining a confidence for the pattern template determined by the pattern analysis; and
- identifying the pattern template determined by the pattern analysis as a general pattern upon determining that the confidence is less than a threshold.

16. The non-transitory computer readable storage medium of claim 9, wherein the optimized runtime configuration deploys limited processor and memory resources of the shared computing environment to perform the task based on the timeseries workload prediction, and wherein the task is a model training.

17. A method of allocating resources of a shared computing environment to a plurality of tasks, the method comprising:
- receiving a plurality of client requests for an optimized runtime configuration of the shared computing environment for executing respective tasks;
- receiving runtime data of the tasks collected from a prior runtime;
- inferring a runtime configuration of each of the tasks from the runtime data;
- determining a predicted timeseries workload for the shared computing environment;
- updating the runtime configuration of each of the tasks to including the timeseries workload prediction, wherein the updating outputs the optimized runtime configuration of each of the tasks;
- scheduling an execution of each of the tasks over a time window according to the optimized runtime configurations of each of the tasks; and
- configuring the shared computing environment over the time window according to the optimized runtime configurations in executing the tasks.

18. The method of claim 17, further comprising outputting the optimized runtime configurations to a configuration file available to a scheduler performing the scheduling.

19. The method of claim 17, wherein inferring the runtime configurations further comprises identifying a pattern template for each of the tasks based on the runtime data.

20. The method of claim 17, wherein each of the optimized runtime configurations deploy limited processor and memory resources of the shared computing environment to perform the respective task based on the timeseries workload prediction, and wherein the tasks are model training tasks.

* * * * *